United States Patent [19]
Otto

[11] Patent Number: 4,799,808
[45] Date of Patent: Jan. 24, 1989

[54] COMPACT SEAL
[75] Inventor: Dennis L. Otto, Malvern, Ohio
[73] Assignee: The Timken Company, Canton, Ohio
[21] Appl. No.: 124,510
[22] Filed: Nov. 23, 1987

Related U.S. Application Data

[63] Continuation-in-part of Ser. No. 79,175, Jul. 29, 1987, which is a continuation-in-part of Ser. No. 811,657, Dec. 19, 1985, abandoned.

[51] Int. Cl.⁴ .............................................. F16C 33/78
[52] U.S. Cl. ...................................... 384/481; 277/95; 384/486
[58] Field of Search ................... 277/25, 134, 215, 53, 277/29, 133, 95; 384/486, 481

[56]  References Cited
U.S. PATENT DOCUMENTS

| | | | |
|---|---|---|---|
| 3,363,952 | 1/1968 | Paterson | 384/486 |
| 3,519,316 | 7/1970 | Gothberg | 384/486 |
| 4,389,053 | 6/1983 | Innis et al. | 277/95 |

*Primary Examiner*—Lenard A. Footland
*Attorney, Agent, or Firm*—Gravely, Lieder & Woodruff

[57]  ABSTRACT

A compact seal assembly fits into the end of a bearing and effectively retains grease within the bearing while excluding contaminants, notwithstanding operation of the bearing within a hostile environment. The seal assembly includes a shield having an axial mounting portion which fits over the inner race of the bearing and an outwardly directed flange, as well as a smooth sealing surface on both. The seal has a case which fits into the outer face of the bearing and an elastomeric sealing element which establishes several barriers along the sealing surface of the shield. The first barrier exists at a pumping labyrinth which encircles, but is spaced outwardly from the axial segment of the sealing surface where it is exposed to the interior of the bearing. The labyrinth contains wedge-shaped cavities which pump the grease back toward the interior of the bearing. The next barrier is along a primary dirt lip which actually contacts the axial portion of the sealing surface, it being urged against that surface by a garter spring. Another barrier exists along a secondary dirt lip which contacts the radial portion of the sealing surface, that is the portion on the flange of the shield. The primary dirt lip lies between the pumping labyrinth and the secondary dirt lip, with these portions of the sealing element being separated by grooves. Rings of grease occupy the grooves, and this grease extends outwardly to and adheres to the sealing surface so as to establish still more barriers along the sealing surface.

20 Claims, 3 Drawing Sheets

COMPACT SEAL

RELATED APPLICATION

This application is a continuation-in-part of application Ser. No. 79,175, filed July 29, 1987, which in turn is a continuation-in-part of application Ser. No. 811,657, filed Dec. 19, 1985, now abandoned.

BACKGROUND OF THE INVENTION

This invention relates in general to seals and more particularly to seals that are useful in hostile environments and to such seals combined with machine structures in which they are used.

The wheel bearings for road vehicles operate in a hostile environment in that they are exposed to considerable moisture as well as dust, dirt and grit, and this holds particularly true for light trucks and other vehicles equipped with four wheel drive, for these vehicles are expected to negotiate unpaved roads, as well as the terrain itself. The traditional seal for the wheel bearings of four wheel drive vehicles has two radial lips, that is a primary lip and a secondary lip, both of which contact a cylindrical sealing surface. The primary lip, which is on the lubricant side of the seal where it is exposed to the interior of the bearing, carries a garter spring which urges it tightly against the sealing surface to thereby establish a highly effective barrier along the sealing surface. That barrier retains the lubricant within the bearing. The secondary lip is maintained against the sealing surface by the natural bias of the elastomer from which it is molded, and it likewise establishes a barrier along the sealing surface, but that barrier is presented away from the interior of the bearing and thus serves to exclude contaminants from the bearing. Owing to the effectiveness of the primary lip, the secondary lip may starve for lubrication and run hot. This in turn causes the secondary lip to harden and loose its effectiveness as a barrier to the ingress of contaminants.

Because of the severity of the environment in which the typical wheel bearing seal of a four wheel drive vehicle operates, it is not uncommon to find the seal used in conjunction with another or supplementary seal located somewhat beyond its secondary lip. The supplementary seal, while perhaps providing an additional measure of protection, creates a pocket in which water and other contaminants may be trapped when the supplementary seal is less than totally effective, and that water causes the main seal to deteriorate. When this occurs, the bearing fails prematurely.

With or without a supplementary seal, radial lip seals of the type traditionally used to protect the wheel bearings on off-the-road vehicles have a somewhat limited lifespan which is considerably less than the bearings they are designed to protect. Often when a seal fails, the failure goes undetected, and by the time it is discovered, the bearing has deteriorated, indeed prematurely. Thus, the failure of a seal often results in replacement of not only the failed seal, but the bearing as well.

The seals used to protect the bearings in the wheels of large over-the-road trucks and trailers are likewise subjected to severe demands, both from the standpoint of endurance and contaminants. Whereas, the seals of off-the-road vehicles serve to retain grease, the seals for over-the-road trucks, at least those used on American highways, serve to contain oil. This derives from the fact that the level of oil within a bearing is easily ascertained when the bearing is fitted with a simple sight glass. Grease, on the other hand, does not lend itself to simple inspection procedures, and thus maintenance schedules must be established for wheel bearings to be lubricated, lest they will run dry. But oil is more difficult to contain than grease, and furthermore does not effectively lubricate those lips of the seals which are designed to exclude contaminants. This causes the lips to wear excessively which in turn diminishes their effectiveness as barriers to the ingress of contaminants. Clearly, grease would be the superior lubricant for the wheel bearings of large highway trucks were it not for the difficulty of determining the amount of grease remaining in the bearing.

On a much larger scale, sealed work roll bearings are gaining acceptance and replacing more conventional bearings which are protected with seals fitted to the chocks in which the bearings are housed. To facilitate the conversion, the sealed work roll bearing must fit in the space formerly occupied by a conventional bearing, yet must further contain seals and of course be capable of sustaining the same loads. The seals fit into the relatively small spaces at the ends of the bearings where they must effectively retain the lubricant and exclude contaminants. And contaminants are plentiful, for mill rolls run in an environment of grit and spray which can be quite harmful to a bearing if they enter the bearing.

The seal assembly of the present invention fits into the end of a bearing and provides highly effective barriers to the escape of grease-type lubricant as well as to the ingress of contamination. Yet its lips, two of which actually bear against a metal sealing surface, receive an adequate supply of lubrication and do not experience excessive wear. The seal furthermore does not require a highly effective secondary sealing arrangement to isolate the interior of the bearing from contaminants. Aside from the foregoing, the seal assembly is self-contained and can be installed as a unit in the bearing.

DESCRIPTION OF THE DRAWINGS

In the accompanying drawings which form part of the specification and wherein like numerals and letters refer to like parts wherever they occur

DETAILED DESCRIPTION

Figure 1:
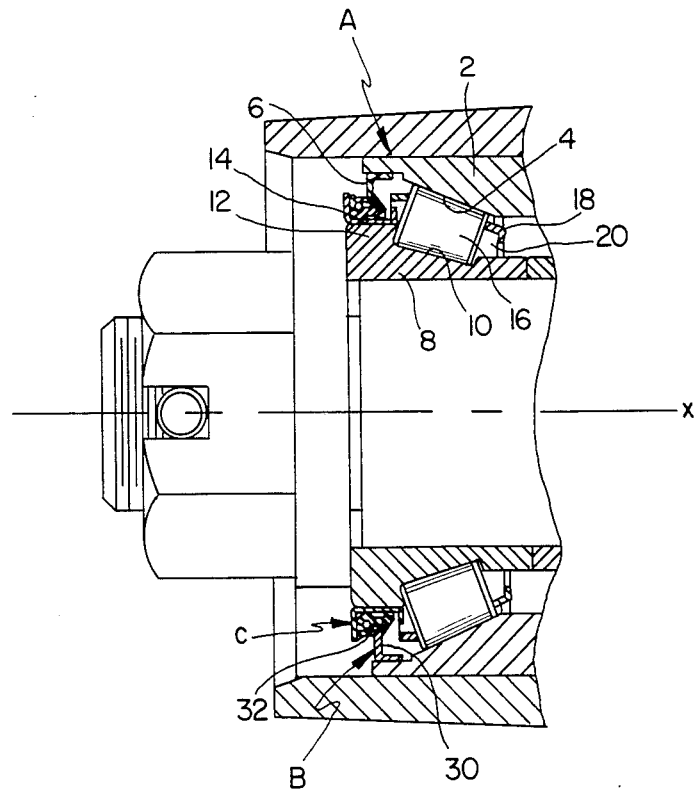
FIG. 1 is a sectional view of a bearing fitted with a compact seal assembly constructed in accordance with and embodying the present invention.

Referring now to the drawings, a tapered roller bearing A (FIG. 1) is at its end closed by a seal B and a cooperating shield C, both of which actually fit into and form a part of the bearing A. The seal B and shield C further serve to unitize the bearing A in the sense that they hold the components of the bearing A together, thus enabling the bearing A to be handled without falling apart. The bearing A is highly compact, yet possesses the large load-carrying capacity and the durability which are characteristic of tapered roller bearings. As such, the bearing A is suited for use in vehicular wheels.

The bearing A includes (FIG. 1) a cup 2 which is contained within a surrounding structure such as the hub of a vehicular wheel. The cup 2 has an inwardly presented raceway 4 which runs out to a cylindrical counterbore 6 which in turn opens out of the end of the cup 2. The cup 2 surrounds a cone 8 which fits over a shaft or spindle and has a tapered raceway 10 which faces and indeed is encircled by the cup raceway 4. The cone raceway 10 leads out to a thrust rib 12 having a cylindrical outwardly presented surface 14 of greater diameter, and that surface in turn leads out to that end of the cone 8 known as the cone back face. The thrust rib 12 forms an integral part of the cone 8, and its cylindrical surface 14 lies within the counterbore 6 at the end of the cup 2, its back face being against a nut or some other abutment on the shaft to keep the cone 8 from moving axially out of the cup 2.

In addition to the cup 2 and the cone 8, the bearing A has tapered rollers 16 (FIG. 1) which are arranged in a row between raceways 4 and 10 of the cup 2 and cone 8. Along their large end faces the rollers 16 abut against the thrust rib 12 for the cone 8, so that the thrust rib 12 prevents the rollers 16 from being expelled from the space between the raceways 4 and 10 when the bearing A is subjected to radial loads. The rollers 16 are contained within a cage 18 which maintains the proper spacing between adjacent rollers 16, and further holds the rollers 16 around the cone 8 when the cone 8 is removed from the cup 2. Each cage 18 has a large end ring which extends across the large end faces of the rollers 16 and in so doing projects into the counterbore 6 at the corresponding end of the cup 2. The tapered rollers 16 and the cage 18 for those rollers 16 move within a sealed or isolated annular cavity 20 which is closed at its one end by the seal B and shield C.

The cup 2 and cone 8 are concentric about the axis x of rotation for the bearing A, and in the operation of a typical wheel bearing for a light truck, the cup 2 is stationary, while the cone 8 revolves. By virtue of this relative rotation, the tapered rollers 16 move along the raceways 4 and 10, and to reduce friction, particularly between the large end faces of the rollers 16 and the thrust rib 12 of the cone 8, a supply of lubricant, which is a grease, exists within the annular cavity 20. Indeed, the tapered rollers 16 tend to pump the lubricant toward the thrust rib 12. The seal B and shield C generally occupy the annular space between the surface of the cup counterbore 6 and the cylindrical surface 14 of cone thrust rib 12 and prevent the lubricant from escaping. The seal B and shield C further exclude dirt, water and other contaminants from the interior of the bearing A. Thus, the seal B and shield C serve to isolate the annular cavity 20 that exists between the cup 2 and the cone 8. Since the cavity 20 contains the tapered rollers 16, it experiences wide variations in temperature, but these variations do not significantly affect the pressure within the cavity 20, because the seal B further vents the cavity 20. The seal B and shield C together constitute a seal assembly.

Figure 2:
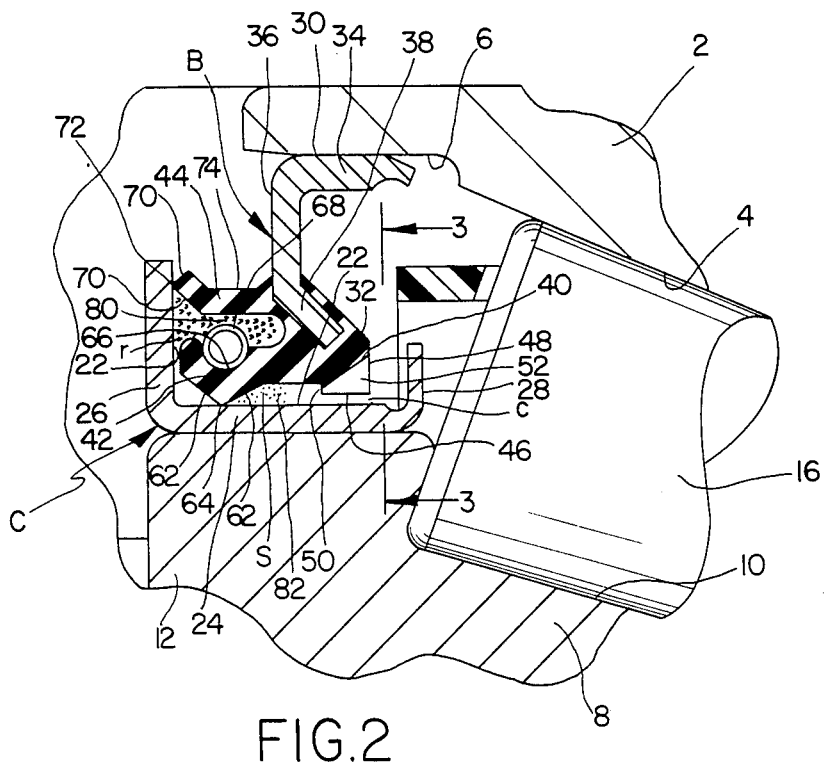
FIG. 2 is an enlarged fragmentary sectional view of the seal assembly.

Considering the shield C first, it is fitted over the thrust rib 12 on the cone 8 where it provides a sealing surface 22 with which the seal B cooperates to establish barriers at the ends of the annular cavity 20 (FIG. 2). To this end, the shield C is generally speaking rigid, and preferably constitutes nothing more than a metal stamping consisting of an axial mounting portion 24, a flange 26 which projects radially outwardly from one end of the axial portion 24, that is the end which is presented away from the cavity 20, and a curl 28 that projects radially outwardly from the other end of the axial portion 24, although not as far as the flange 26. The sealing surface 22 lies along the axial portion 24 and the flange 26. The shield C is pressed over the thrust rib 12 of the cone 8, so that an interference fit exists between its axial portion 24 and the surface 14 of the thrust rib 12. The flange 26 lies flush with or is set slightly inwardly from the back face of the cone 8. The shield C exists partially within the counterbore 6 of the cup 2, but does not project radially outwardly enough to actually contact the cup 2.

The seal B includes (FIG. 2) a metal seal case 30 and sealing element 32 which is bonded to the case 30, it being formed from an elastomer or some other flexible substance. The seal case 30, which serves as a mount for the elastomeric sealing element 32, has an axial portion 34 which is cylindrical and fits into the counterbore 6 at one end of the cup 2, there being an interference fit between the cylindrical surface of the bore 6 and the axial portion 34, so that the seal B remains firmly in place within the cup 2. The interference fit further establishes a static seal along the surface of the counterbore 6. In addition, the seal case 30 has a radial portion 36, which projects radially inwardly from one end of the axial portion 34, and an oblique portion 38 which projects back toward the large ends of the tapered rollers 16 at an oblique angle with respect to the axis x of rotation. The radial and oblique portions 36 and 38 are offset axially with respect to the flange 26 of the shield C so as not to interfere with the shield C. While the radial and oblique portions 36 and 38 project toward the axial portion 24 of the shield C, enough space exists between them and both the axial portion 24 and flange 26 of the shield C to accommodate the elastomeric sealing element 32.

The elastomeric sealing element 32 is bonded to the seal case 30 along the inner edge of the oblique portion 38 and also along the two faces of the oblique portion 38 immediately beyond that edge, as well as to a very small segment of the radial portion 36 (FIG. 2). From its point of attachment the sealing element 32 projects generally toward the axial portion 24 and flange 26 and indeed lies between the flange 26 and the curl 28, so that the seal B cannot be displaced axially from the shield C or vice-versa. Nevertheless, the seal B and shield C accommodate relative rotation, and indeed the sealing element 32 effects a live or dynamic seal with respect to the shield C.

More specifically, the sealing element 32 is configured to effect at least three barriers along the shield C (FIG. 2). The first of these barriers exists along a labyrinth 40 which is presented toward the sealed cavity 20 and surrounds the axial portion 24 of the shield C adjacent to the curl 28, yet is spaced from the sealing surface 22 on the axial portion 24. The second barrier constitutes a primary dirt lip 42 which is directed axially away from the labyrinth 40 and inwardly toward the axial portion 24 of the shield C where it actually contacts the sealing surface 22 near the flange 26. The third barrier takes the form of a secondary dirt lip 44 which projects axially toward the flange 26 where it also contacts the sealing surface 22 of the shield C. The two dirt lips 42 and 44 exist on the air side of the seal B, and their primary purpose is to exclude contaminants, such as water and dirt, from the sealed cavity 20. The primary labyrinth 40 exists on the lubricant side of the seal B, and its primary purpose is to retain the lubricant within the cavity 20.

Figure 3:
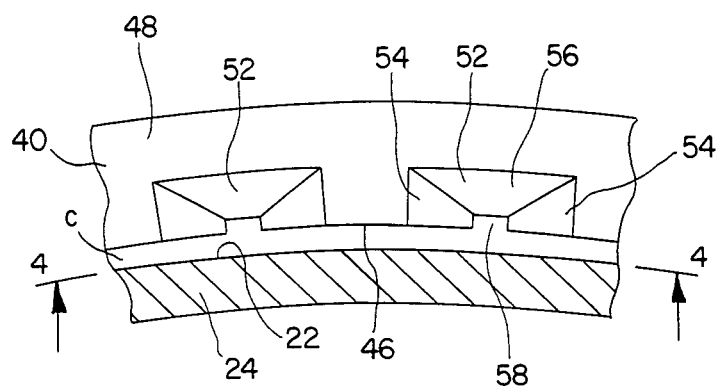
FIG. 3 is a sectional view of the seal assembly taken along line 3—3 of FIG. 2 and showing the inner face of the pumping labyrinth for the seal.
Figure 4:
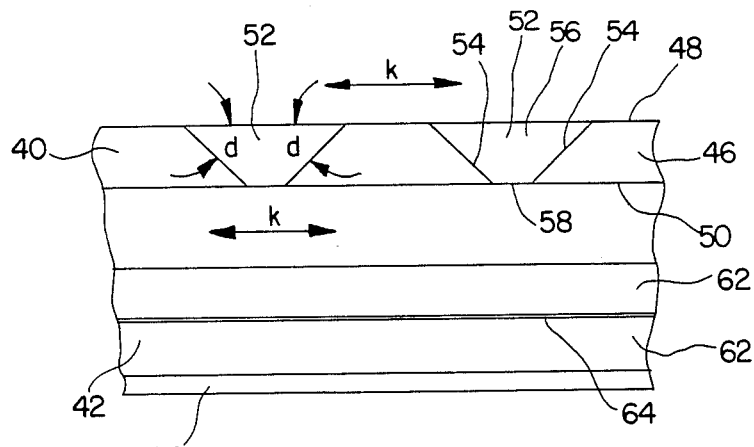
FIG. 4 is a view taken along line 4—4 of FIG. 3 and showing the underside of the seal element.

Considering the labyrinth 40 first, it turns radially inwardly and terminates at a circumferential or cylindrical face 46 which is presented toward, but is slightly greater in diameter than, that segment of the sealing surface 22 which is on the axial portion 24 of the shield C. As a consequence, a slight clearance c exists between the sealing surface 22 and the face 46, and this clearance typically could range between 0.002 and 0.064 inches, this being a working clearance since some eccentricity between the labyrinth 40 and sealing surface 22 may exist as the result of manufacturing tolerances. On one side of the cylindrical surface 46 is an inner end face 48 which is presented toward the sealed cavity 20, and on the other side is an outer end face 50 which is presented toward the dirt lip 42. Both faces are radial, that is they lie in planes which are perpendicular to the bearing axis x, and hence they are parallel to each other. Neither the cylindrical face 46 nor the inner end face 48 is continuous, but instead both are interrupted by small pockets or cavities 52 (FIGS. 2–4) which are configured to pump or impell any lubricant that enters them back toward the tapered rollers 16, that is back into the sealed cavity 20. The cavities 52 are arranged at equal circumferential intervals along the labyrinth 40, with each cavity 52 opening out of both the cylindrical face 46 and the inner end face 48 of the labyrinth 40 and interrupting the edge at which those faces intersect. To effect the pumping or impelling action, each cavity 52 has a pair of side faces 54 (FIGS. 3 and 4) which are located at equal angles d with respect to the direction of relative rotation k between the labyrinth 40 and sealing surface 22. The angle d should be between 30° and 60° and should preferably be 45°. Thus, the side faces 54 intersect the cylindrical face 46 along lines which are oblique to the direction of relative rotation k between the labyrinth 40 and sealing surface 22, which is, of course, the circumferential direction. Completing the cavity 52 is an outside connecting face 56 which extends between the two side faces 54 and is oriented at an oblique angle with respect to the circumferential face 46, it being farthest from the circumferential face 46 at the inner end face 48. The two side faces 54 are planar, while the connecting face 56 may be planar or perhaps slightly concave. All three of the faces 54 and 56 intersect the outer end face 50, with the lines of intersection for the side faces 54 being spaced slightly apart and the line of intersection for the connecting face 56 being outwardly from the circumferential face 46. The result is a small vent aperture 58 that opens out of the outer end face 50 toward the dirt lip 42, that aperture of course being at the small end of the pumping cavity 52.

When the cup 2 or cone 8 rotates, lubricant that is between the sealing surface 22 on the axial portion 24 of the shield C and the cylindrical face 46 of the labyrinth 40 migrates into the pumping cavities 52 where it is deflected axially by the side faces 54. Actually, the relative rotation not only causes the lubricant to flow into each cavity 52, but further causes it to come against one side face 54 of each cavity 52, and that side face 54, being at the angle d with respect to the direction of relative rotation k, which is of course the circumferential direction, deflects the lubricant back toward the sealed cavity 20 and the tapered rollers 16 within it. The outside face 56, inasmuch as it is oblique to the axis x, also deflects lubricant back toward the sealed cavity 20 and allows lubricant, when subjected to the centrifugal forces generated by the relative rotation, to flow outwardly away from the axis x of rotation as the lubricant moves into the cavity 20. By reason of their wedge-shaped configurations, the pumping cavities 52 will deflect the lubricant in the same axial direction, irrespective of the direction of relative rotation. In this regard, in one direction of rotation one side face 54 and the outside face 56 of each cavity 44 will deflect the lubricant back toward the sealed cavity 20 that represents the interior of the bearing A, and in the other direction of rotation, the other side face 54 and the outside face 56 will likewise deflect the lubricant, again axially back toward the sealed cavity 22. The vent apertures 58 at the ends of the cavities 52 together with the clearance c between the circumferential face 46 and the sealing surface 22 preclude the labyrinth 40 from trapping air or lubricant within the cavity 20 under high pressure.

The primary dirt lip 42 (FIGS. 2 and 4) projects axially away from the pumping labyrinth 40 and toward the flange 26 on the shield C, and near the flange 26 it is provided with a pair of side faces 62 which converge and intersect along a sealing edge 64 that bears against that segment of the sealing surface 22 which is along the axial portion 24 of the shield C. Indeed, the sealing element 32 is molded with the diameter of the sealing edge 64 somewhat less than the diameter of the sealing surface 22 on the axial portion 24, so that the natural bias of the elastomer will urge the dirt lip 42 along its edge 64 against the sealing surface 22. Even so, the dirt lip 42 on its outwardly presented surface, that is the surface which is presented away from the axis x, is provided with an outwardly opening groove 66 of arcuate cross-section which lies almost directly behind the sealing edge 64 and contains a garter spring 68 that further urges the sealing edge 64 of the lip 42 against the sealing surface 22. The garter spring 68, which is formed from stainless steel, has a low spring rate and open convolutions, that is spaced apart convolutions.

The secondary dirt lip 44 (FIG. 2) lies generally parallel to the primary dirt lip 42, only at a greater distance from the axis x, it projecting from the seal case 30 generally in the region of juncture between the radial portion 36 and the oblique portion 38. The lip 44 at its free end, that is the end remote from the case 30, turns radially outwardly and bears against that portion of the sealing surface 22 which lies along the flange 26 of the shield C. Indeed, the outwardly directed portion of the lip 44 has two surfaces 70 which converge to produce another sealing edge 72, the latter of which bears against the sealing surface 22 at the flange 26. If it were not for the flange 26, the lip 44 would project axially beyond the sealing surface 22 at the flange 26, so the flange 26 distorts the lip 44 and the natural bias of the elastomer maintains the sealing edge 72 against the segment of the sealing surface 22 that is along the flange 26. The outwardly directed portion of the secondary lip 44 further imparts to the lip 44 a somewhat concave outwardly presented surface 74 which causes water to drain toward the midportion of the lip 44 and then off, instead of toward the sealing edge 72 and the barrier that it establishes.

The spaced apart primary and secondary lips 42 and 44 create a deep axially opening groove 80 (FIG. 2) within the sealing element 32, a groove that opens toward the flange 26 of the shield C. The groove 80 is filled with grease which adheres to both the metal sealing surface 22 and the smooth elastomeric surfaces of the two lips 42 and 44, producing a ring r of grease. When relative rotation occurs between the seal B and the shield C, the grease adjacent to the flange 26 of the shield C tends to remain with the sealing surface 22 and to slide relative to the grease that is adjacent to the two lips 42 and 44, which grease tends to remain with the two lips 42 and 44 of the sealing element 32. In effect, the lubricant undergoes shear when relative rotation occurs between the seal B and shield C. The ring r of grease in the groove 80 in effect forms still another barrier between the sealing element 32 and the sealing surface 22 and the actual live seal exists along a shear line in the lubricant. Between the edge 64 of the primary dirt lip 42 and the outer end face 50 of the labyrinth 40 another groove 82 exists within the sealing element 32, and while this groove is somewhat wider than the groove 80, it is not nearly as deep. Moreover, the groove 82 opens radially inwardly toward the segment of the sealing surface 22 that lies along the axial portion 24 of the shield C. It also contains grease—indeed, a ring s of grease—which establishes another barrier between the sealing element 32 and the sealing surface 22.

The seal B is loaded onto the shield C with the curl 28 of the latter temporarily extended axially as an extension of the axial portion 24. Preferably a mandrel is placed against the end of the axially extended curl 28, and that mandrel has a tapered surface which leads up to the end of the curl 28. The seal B is advanced along the tapered surface, where its primary dirt lip 42 is expanded to the diameter of the axially directed curl 28 and the axial portion 24 that is beyond the curl 28. The expanded lip 42 moves over the curl 28 and onto the segment of the sealing surface 22 that is along the axial portion 24 of the shield C. Once the sealing element 32 of the seal B is fully around the axial portion 24 of the shield C, the curl 28 is bent outwardly to its normal operating configuration, and this captures the seal B between the flange 26 and curl 28 of the shield C. However, before the seal B is fitted to the shield C, the axially opening groove 80 of the former is filled—indeed overfilled—with grease. The groove 82 is also filled with grease.

The bearing A is assembled by inserting the cone assembly, that is the cone 8 along with the rollers 16 held around it by the cage 18, into the cup 2 together with an adequate supply of grease-type lubricant. Indeed, slightly more lubricant than is necessary may be introduced into the annular cavity 20 of the bearing A. In any event, once the bearing A is assembled, the seal B and shield C are installed as a unit into its end to establish a barrier across the end of the annular cavity 20. In particular, the axial portion 34 of the seal case 30 is pressed into the counterbore 6 of the cup 2, while the axial portion 24 of the shield C is pressed over the cylindrical surface 14 on the thrust rib 12 of the cone 8. To this end, a punch having offset surfaces is brought against the radial portion 36 of the seal case 30 and the flange 26 on the shield C to force the seal case 30 into the counterbore 6 and the shield C over the cylindrical surface 14 of the rib 12. The offset between the faces of the punch is such that the seal B and shield C acquire the proper axial positions with respect to each other, and when so positioned the sealing edge 72 of the secondary dirt lip 44 contacts the portion of the sealing surface 22 that is along the flange 26 of the shield C, and indeed the lip 44 is slightly deflected by the flange 26.

When the bearing A is set in operation, the cone 8 rotates relative to the cup 2, or vice-versa. In either case the rollers 16 move along the two raceways 4 and 10 and pump the lubricant toward the large end of the annular cavity 20, that is toward the end at which the seal B is located, this being an inherent operating characteristic of a tapered roller bearing. Some of the grease-type lubricant works onto the axial segment of the sealing surface 22 where it becomes caught up in the cavities 52 of the pumping labyrinth 40. The side walls 54 of the cavities 52 impel the lubricant toward the large ends of the rollers 16, and this occurs irrespective of whether the cone 8 or the cup 2 is the rotating part and irrespective of the direction of relative rotation.

The ring s of lubricant in the shallow groove 82 that is between the sealing edge 64 of the primary lip 42 and the outside face 50 of the labyrinth 40 serves as a barrier along the sealing surface 22, both to the escape of lubricant beyond the labyrinth 40 and to the ingress of contaminants. A small portion of this lubricant seeps under the sealing edge 64 and provides an elastohydrodynamic film between the edge 64 and the surface 22. That film in effect supports the primary dirt lip 42 on the axial segment 24 of the sealing surface 22, and thereby reduces friction substantially, so that the lip 42 experiences minimal wear and does not overheat and become brittle.

The ring r of lubricant within the groove 80 extends to and adheres to the radial segment of the sealing surface 22 that is along the flange 26. This lubricant tends to remain with the flange 26 and also with the sealing element 32 when relative rotation occurs between the seal B and shield C, and as a result a line of lubricant shear develops within the ring r of lubricant. This ring r of grease in its own right presents another barrier along the sealing surface 22. A small portion of grease from the ring r further works out along the sealing surface 22 and provides lubrication for the sealing edge 72 of the secondary lip 44 to reduce friction between it and the radial segment of the sealing surface 22. Indeed, the centrifugal forces generated as a result of the relative rotation tend to feed lubricant to the sealing edge 72 to maintain the lubrication at that edge. Thus, the secondary lip 44 likewise experiences minimal wear and does not overheat and become brittle.

While the pumping labyrinth 40 serves primarily to keep the grease-type lubricant in the annular cavity 20, the two dirt lips 42 and 44 as well as the rings r and s of lubricant in the two grooves 80 and 82 serve primarily to exclude contaminants, such as water, dirt and dust. Both lips 42 and 44 along their respective sealing edges 64 and 72 actually contact the sealing surface 22 of the shield C and in that sense establish positive barriers with the sealing surface 22, and these barriers are enhanced by the additional barriers created by the rings r and s of lubricant in the grooves 80 and 82. In time the lubricant in the groove 80 picks up dirt and the ring r becomes even more effective as an impediment to the ingress of contaminants. The dirt causes the lubricant to adhere better to the flange 26 and the sealing element 32, but does not significantly diminish its ability to slip along the lubricant line of shear that is within it.

Moreover, when the cup 2 rotates, the secondary lip 44 serves as a flinger which tends to throw contaminants and moisture away from the seal B. On the other hand, when the cone 8 rotates, the flange 26 of the shield C serves as the flinger. While the secondary lip 44 is exposed to water and other contaminants, its concave surface 74, where presented upwardly, creates a channel which directs the water away from the sealing edge 72 and allows it to flow harmlessly off of the lip 44.

In time, some of the grease-type lubricant will escape, but the two grooves 80 and 82 remain filled with lubricant. In this regard, some lubricant will migrate along the surface 22 past the labyrinth 40 and will replace any lubricant purged from the groove 82. By the same token, lubricant from the groove 82 will escape past the sealing edge 64 of the lip 42 and replace lubricant lost from the groove 80. To this end, the included angle between the inboard side face 62 on the primary lip 42 and the sealing surface 22 is less than the included angle between the outboard face 62 of the primary lip 42 and the sealing surface 22. Thus, the grease-type lubricant is easily purged past the primary lip 42, ensuring that the cavity 80 remains full as long as the cavity 82 contains lubricant.

Increases in pressure within the annular cavity 20 of the bearing A serve to facilitate this purging, but excessive pressures are avoided, because the labyrinth vents through the clearance c and its vent apertures 58, while the lips 42 and 44 are oriented to lift away from the sealing surface when subjected to excessive pressure. All that remains is the lubricant in the grooves 80 and 82, and this lubricant displaces momentarily to provide a path to accommodate venting the excessive pressure.

While the sea B and shield C illustrated and described fit in the end of a double row bearing A, they may also be fitted to the ends of single row tapered roller bearings. In operation the cones may rotate, while the cup remains fixed, or vice-versa.

Irrespective of whether the seal B is used on a single row bearing or a double row bearing, it provides complete protection for the bearing where the bearing is used as a wheel bearing for a light or heavy truck. Hence no need exists for supplementary seals, and this eliminates the expense of installing such seals and providing machined surfaces for them. The seal B and shield C further unitizes the bearing A for handling purposes, and thus the bearing A may be supplied as a preassembled and prelubricated unit. Furthermore, the sealing surface 22 along which seal B establishes barriers to the escape of lubricant and the ingress of contaminants is furnished by the seal or bearing manufacture, and this removes control of these surfaces from the assembler of the part into which the bearing A is fitted.

Figure 5:
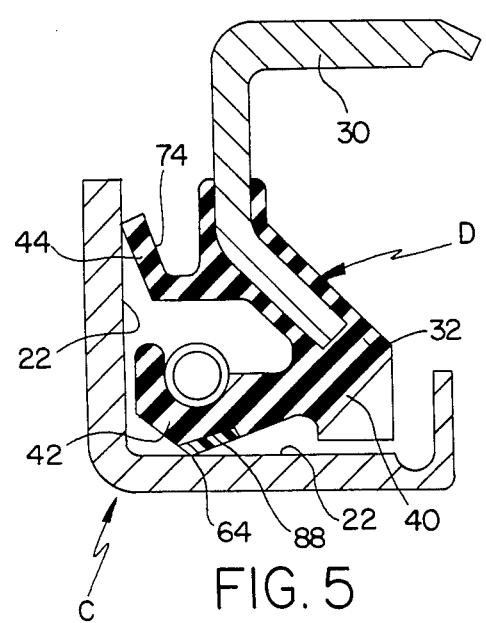
FIG. 5 is a sectional view of a modified seal assembly.

A modified seal D (FIG. 5) is very similar to the seal B and like the seal B cooperates with a shield C to establish several barriers to the escape of lubricant and the ingress of contaminants. However, the primary dirt lip 42 of the seal D has bonded to it an insert 88 that is formed from a low friction polymer, such as polytetrafluoroethylene (PTFE), which is both durable and flexible. The sealing edge 64 exists along the insert 88. Also, the secondary dirt lip 44 for the seal D is oriented at a lesser angle with respect to the radial segment of the sealing surface 22, and this increases the depth of the concave surface 74 on that lip, so that the surface 74 imparts a deep outwardly opening groove to the elastomeric sealing element 32.

Figure 6:
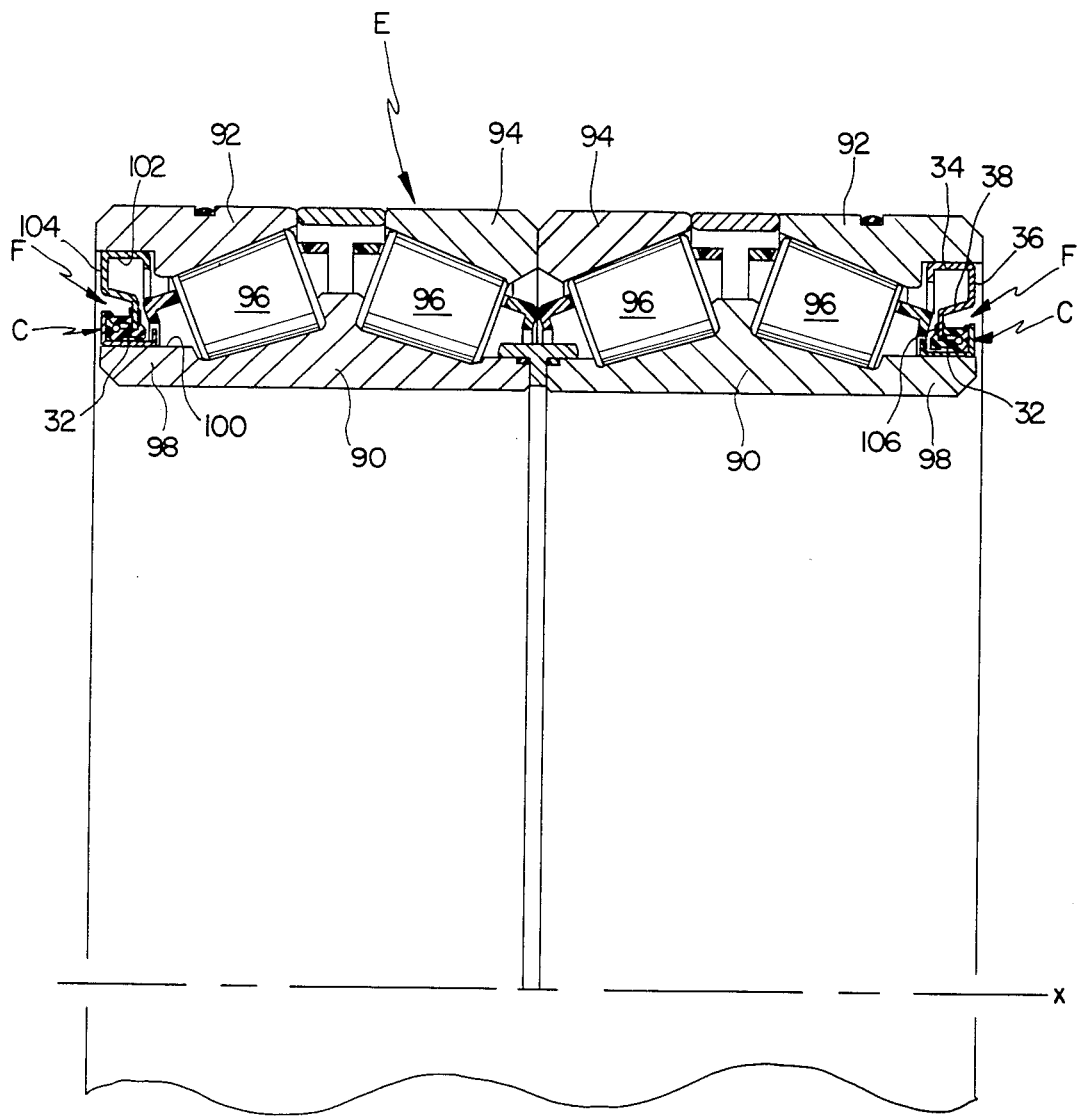
FIG. 6 is a partial sectional view of a sealed work roll bearing provided with the seal assembly of the present invention modified to accommodate that bearing.

A multirow bearing E (FIG. 6), which is suitable for supporting a work roll of mill stand where metal is worked, is closed by modified seals F which likewise fit into the ends of the bearing E and thus eliminate the need for detached outboard seals of the type conventional in the industry.

The bearing E has two double cones 90, each of which is surrounded by an outside cup 92 and an inside cup 94, and between each cup 92 and 94 and the cone 90 which it surrounds in a row of tapered rollers 96. Unlike the bearing A, the bearing E has the large ends of its tapered rollers 96 in its endmost rows presented away from the ends of the bearing D and toward the center of the bearing E. At the outer end of each double cone 90 is an extended rib 98 having a cylindrical surface 100 that is presented outwardly. On the other hand, each of the outside cups 92 has a counterbore 102 that lies radially outwardly from the cylindrical surface on the rib 98 of the cone 90 which that cup surrounds. The seals F are fitted into the counterbores 102 at the ends of the outer cups 92 and here they cooperate with shields C which fit over the cylindrical surfaces 100 on the retaining ribs 98 of the cones 8.

Each seal F is essentially the same as the seal B, only it is considerably larger, and furthermore possesses a seal case 104 which differs slightly in configuration from the seal case 30 of the seal B, this being necessary to close the larger space opposite the small ends of the rollers 96 in the endmost row. Like the seal case 30, the case 104 has an axial portion 34, a radial portion 36, and an oblique portion 38 arranged in that order from the counterbore 102 of the cup inwardly. In addition, the case 104 has another or inner radial portion 106 which projects radially inwardly from the end of the oblique portion 38. The elastomeric sealing element 32 is bonded to the other or inner radial portion 106, but cooperates with the shield C in the same manner to establish multiple barriers along the sealing surface 22.

The bearing E carries its own seals F, and may rely solely on the seals F for its protection or may rely on the seals F along with chock-mounted seals, the sealing arrangement on the application. Even though the bearing E carries its own seals F, it is no larger than conventional work roll bearings which do not have seals, and thus can be readily substituted for such conventional bearings.

This invention is intended to cover all changes and modifications of the example of the invention herein chosen for purposes of the disclosure which do not constitute departures from the spirit and scope of the invention.

What is claimed is:

1. In combination with a sealing surface that exists around an axis of rotation and has a generally axially directed portion and a generally radially directed portion, a seal for establishing a barrier with the sealing surface so as to isolate a region generally between two components, one of which carries the seal and the other the sealing surface, when relative rotation about the axis of rotation exists between the two components, said seal comprising a labyrinth having a first face presented toward, yet spaced from the axially directed portion of the sealing surface and a second face presented toward the isolated region; a first dirt lip extended toward and bearing against the axially directed portion of the sealing surface; and a second dirt lip extended toward and bearing against the generally radially directed portion of the sealing surface, the first dirt lip being located between the labyrinth and the second dirt lip.

2. The combination assembly according to claim 1 wherein the dirt lips are directed generally obliquely toward the sealing surface and away from the labyrinth so that an increase in pressure on those sides of dirt lips that are presented toward the isolated region will, if sufficient in magnitude, cause the dirt lip to separate slightly from the sealing surface.

3. The combination according to claim 2 wherein the first face of the labyrinth has pumping cavities which open out of its first and second faces, with each pumping cavity being wider at the second face than remote from the second face and having a face that is oblique to the direction of relative rotation between the labyrinth and the sealing surface, so that the lubricant which enters the cavity will be deflected out of it into the isolated region by reason of the relative rotation.

4. The combination according to claim 1 wherein the dirt lips are biased against the sealing surface.

5. The combination according to claim 4 wherein the seal further comprises a garter spring extended around the first dirt lip and urging it against the sealing surface.

6. The combination according to claim 1 wherein a groove exists between the dirt lips, with the groove opening generally toward the radial portion of the sealing surface; and further comprising grease in the groove and contacting the radial portion of the sealing surface.

7. The combination according to claim 1 wherein the seal further comprises a generally rigid seal case fitted to the component which carries the seal such that a static barrier to the passage of lubricant exists between the case and the component; and wherein the pumping labyrinth and the dirt lips are attached to the seal case.

8. The combination according to claim 7 wherein the pumping labyrinth and the two dirt lips form part of a seal element which is formed from a flexible material and is bonded to the seal case.

9. The combination according to claim 7 wherein the seal element is formed from an elastomer.

10. The combination according to claim 1 wherein the sealing surface exists on a shield that is formed as an integral unit from a generally rigid substance.

11. The combination according to claim 9 wherein the seal is captured on the shield.

12. A seal assembly mounted about an axis of rotation and comprising: a shield formed from a generally rigid material and having a generally axially directed portion and a generally radially directed portion which projects outwardly from the axially directed portion, the shield having a sealing surface located along the axially directed portion where it is presented away from the axis of rotation and also along the radially directed portion; and a seal including a case formed from a generally rigid material, a labyrinth attached to the case and encircling the sealing surface along the axial portion thereof, but being spaced outwardly from the sealing surface, first and second flexible dirt lips attached to the case and contacting the sealing surface, with the first dirt lip being located between the second dirt lip and the labyrinth, each dirt lip where it contacts the sealing surface being oblique to the sealing surface and further being inclined away from the labyrinth, so that an increase in pressure of sufficient magnitude in the region of the labyrinth will cause at least the first dirt lip to separate from the sealing surface and vent the region by the labyrinth, the two dirt lips forming part of a flexible seal element which is bonded to the seal case and has a groove located between the two lips, with the groove opening toward the radial portion of the shield.

13. A seal assembly mounted about an axis of rotation and comprising: a shield formed from a generally rigid material and having a generally axially directed portion and a generally radially directed portion which projects outwardly from the axially directed portion, the shield having a sealing surface located along the axially directed portion where it is presented away from the axis of rotation and also along the radially directed portion; and a seal including a case formed from a generally rigid material, a labyrinth attached to the case and encircling the sealing surface along the axial portion thereof, but being spaced outwardly from the sealing surface, first and second flexible dirt lips attached to the case and contacting the sealing surface, with the first dirt lip being located between the second dirt lip and the labyrinth, the first lip contacting the sealing surface along the axial portion of the shield and the second lip contacting the sealing surface along the radial portion of the shield.

14. A seal assembly according to claim 12 wherein each dirt lip where it contacts the sealing surface is oblique to the sealing surface and inclined away from the labyrinth so that an increase in pressure of sufficient magnitude in the region of the labyrinth will cause at least the first dirt lip to separate from the sealing surface and vent the region by the labyrinth.

15. A seal assembly according to claim 14 wherein the two dirt lips form part of a flexible seal element which is bonded to the seal case and has a groove located between the two lips, with the groove opening toward the radial portion of the shield.

16. A seal according to claim 13 wherein the first lip has a groove which is presented outwardly away from axial portion of the shield, and the seal further includes a garter spring which is located in the groove of the first lip and urges the first lip against the sealing surface.

17. A seal assembly according to claim 16 wherein labyrinth also forms part of the seal element.

18. A seal assembly according to claim 13 wherein the labyrinth has a circumferentially extending face which is presented toward the sealing surface along the axial portion of the shield and an end face which is located at a substantial angle with respect to the circumferentially extending face, there being an edge where the two faces meet, the labyrinth further having pumping cavities which open out of the circumferentially extending face and the end face and interrupt the edge between the two faces, each pumping cavity having side faces which are oblique to the direction of relative rotation between the shield and seal and are larger at the end face than remote from it so that grease which enters the cavity is impelled generally out of it away from the first dirt lip.

19. A seal assembly according to claim 13 wherein the shield further has a curl which is spaced from the radially directed portion and is directed radially outwardly from its axially directed portion, the labyrinth and the two lips of the seal being located between the radially directed portion and the curl of the shield so that the seal is captured on the shield.

20. A seal assembly according to claim 13 wherein the seal includes a sealing element which is formed from a flexible material that is bonded to the seal case, and the labyrinth and the two dirt lips constitute part of the sealing element.

* * * * *

UNITED STATES PATENT AND TRADEMARK OFFICE
CERTIFICATE OF CORRECTION

PATENT NO. : 4,799,808

DATED : January 24, 1989

INVENTOR(S) : Dennis L. Otto

It is certified that error appears in the above-identified patent and that said Letters Patent is hereby corrected as shown below:

ABSTRACT, col. 2, line 7, "face" should be "race".

Col. 9, line 30, "sea" should be "seal".

Col. 10, line 57, should be ":" after "comprising".

Col. 11, line 40, after "shield", should be "so that it cannot be displaced radially or axially from the shield".

Col. 12, line 20, "12" should be "13".

Col. 12, line 61, "to-claim" should be "to claim".

Signed and Sealed this

Twenty-sixth Day of September, 1989

Attest:

DONALD J. QUIGG

*Attesting Officer*   *Commissioner of Patents and Trademarks*